United States Patent
Rising, III et al.

(10) Patent No.: US 6,675,158 B1
(45) Date of Patent: Jan. 6, 2004

(54) METHOD AND APPARATUS FOR ORGANIZING DATA PERTAINING TO AUDIOVISUAL CONTENT

(75) Inventors: Hawley K. Rising, III, San Jose, CA (US); Ali Tabatabai, Beaverton, OR (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 381 days.

(21) Appl. No.: 09/708,257

(22) Filed: Nov. 7, 2000

Related U.S. Application Data (60) Provisional application No. 60/168,430, filed on Nov. 30, 1999.

(51) Int. Cl.⁷ .................................................. G06F 17/30
(52) U.S. Cl. ............................................................ 707/2
(58) Field of Search ................................ 707/3, 5, 4, 101, 707/104.1, 2; 345/723; 382/100, 224; 715/505, 517

(56) References Cited

U.S. PATENT DOCUMENTS 6,236,395 B1 * 5/2001 Sezan et al. ................ 345/723
6,404,925 B1 * 6/2002 Foote et al. ................. 382/224

OTHER PUBLICATIONS

Daniela Rus, Devika Subramanian; "Customizing Information Capture and Access", ACM Transactions on Information System vol. 15, No. !, Jan. 1997, pp. 67–101.*

* cited by examiner

*Primary Examiner*—Charles Rones
*Assistant Examiner*—Apu Mofiz
(74) *Attorney, Agent, or Firm*—Blakely, Sokoloff, Taylor & Zafman LLP.

(57) ABSTRACT

A method and apparatus for organizing data pertaining to audiovisual content are described. According to one embodiment, an exemplary method for organizing data pertaining to audiovisual content includes defining at least one descriptive list for a descriptive portion of the data pertaining to audiovisual content, defining at least one accessing list for an accessing portion of the data pertaining to audiovisual content, and generating a matrix that connects the accessing list to the descriptive list.

30 Claims, 6 Drawing Sheets

ILLUSTRATION OF HIERARCHIES AND FLAGS

METHOD AND APPARATUS FOR ORGANIZING DATA PERTAINING TO AUDIOVISUAL CONTENT

RELATED APPLICATIONS

This application claims the benefit of U.S. Provisional Application No. 60/168,430, filed Nov. 30, 1999.

FIELD OF THE INVENTION

The present invention relates to processing audiovisual data and more specifically to organizing data pertaining to audiovisual content.

BACKGROUND OF THE INVENTION

The Motion Picture Expert Group (MPEG) develops standards concerning audiovisual content. One component of the MPEG standard scheme includes MPEG-7 standards which are directed to providing descriptions of audiovisual content that may be of interest to the user. Specifically, the MPEG-7 standards are developed to standardize information describing the audiovisual content. The MPEG-7 standards may be used in various areas, including storage and retrieval of audiovisual items from databases, broadcast media selection, tele-shopping, multimedia presentations, personalized news service on the Internet, etc.

MPEG-7 standards rely on a set of generic audiovisual description schemes (GAVDS). According to the GAVDS, descriptions are divided into syntactic descriptions and semantic descriptions. A syntactic description is typically concerned with physical properties of the content. Syntactic descriptions may include such video features as, for example, shape, color, position, or texture, and such audio features as, for example, key, mood, or tempo. A semantic description represents human interpretation of the audiovisual content, e.g., a description such as: "a duck hiding behind a tree and a car passing by in the background."

The purpose of the GAVDS is to provide a set of tools in terms of descriptions and description schemes. Using the above division among descriptions, the access to the descriptions is provided using indexes that are built from the semantic descriptions that point into the syntactic descriptions. However, this structure has several deficiencies. First, in some situations, relevant parts of a description of a piece of audiovisual content cannot be located together. For example, when a "semantic" description describes a "syntactic" audiovisual object, the description must be constructed separately and attached to the object by links, regardless of the description's intended purpose or method of generation. In addition, the GAVDS categories are not pure (e.g., a segment designation that contains semantic meaning). As a result, it may be difficult to classify a description as being either semantic or syntactic, which may, in turn, cause an unnecessary proliferation of description schemes. Furthermore, the above structure forces the GAVDS to be a single piece of content, thereby negatively affecting the speed of locating a required description.

Therefore, it would be advantageous to improve the existing structure of the description scheme in order to enable fast and efficient access to information describing audiovisual content that is of interest to the user.

SUMMARY OF THE INVENTION

A method and apparatus for organizing data pertaining to audiovisual content are described. According to one embodiment, an exemplary method for organizing data pertaining to audiovisual content includes defining at least one descriptive list for a descriptive portion of the data pertaining to audiovisual content, defining at least one accessing list for an accessing portion of the data pertaining to audiovisual content, and generating a matrix that connects the accessing list to the descriptive list.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

A method and apparatus for organizing data pertaining to audiovisual content are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
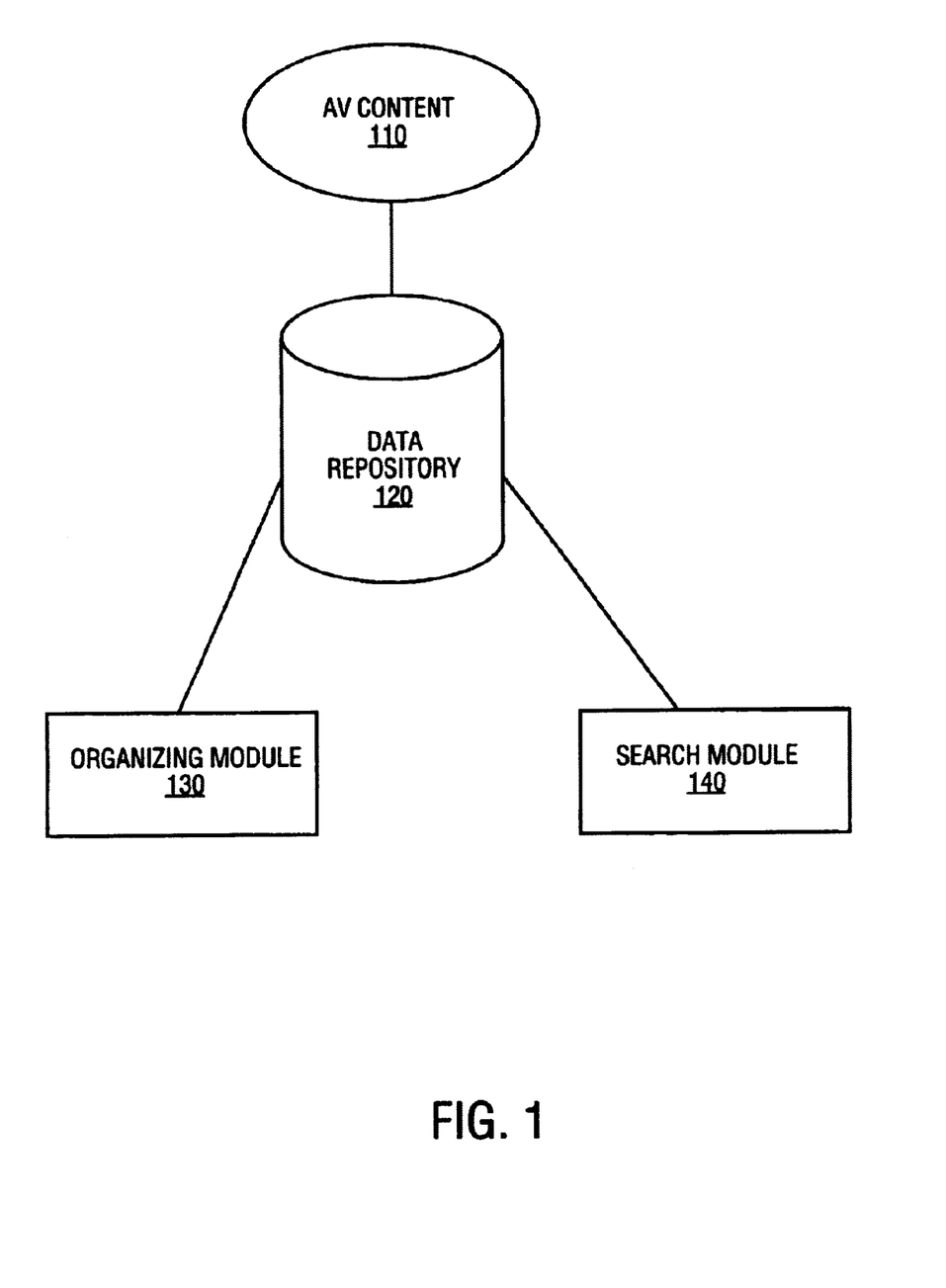
FIG. 1 is a block diagram of one embodiment of a system for storing and retrieving data pertaining to audiovisual content.

FIG. 1 is a block diagram of one embodiment for a system 100 for storing and retrieving data pertaining to audiovisual content. System 100 includes a data repository 120 coupled to audiovisual content 110. Data repository 120 contains data that pertains to audiovisual content 110. In one embodiment, audiovisual content 110 is stored independently. Alternatively, audiovisual content may be stored together with the data pertaining to audiovisual content in data repository 120.

The data pertaining to audiovisual content 110 consists of two parts: a descriptive portion and an accessing portion. The descriptive portion includes information describing audiovisual content 110. For instance, the descriptive data may include a set of descriptions (i.e., descriptors and description schemes) describing a piece of audiovisual content 110, with each description describing a particular feature of this piece. The accessing portion also concerns audiovisual content 110 but is used only to access pieces of audiovisual content 110. For example, the accessing data may include information identifying the above features and specifying their occurrences within audiovisual content 110. The structure of the data in data repository 120 is described in greater detail in conjunction with FIG. 2. The data items may or may not be categorized as semantic and syntactic.

System 100 further includes an organizing software module 130 which organizes the data in data repository 120. Organizing module 130 defines which data in repository 120 is characterized as descriptive and which data is characterized as accessing. In one embodiment, each data item includes a usage bit indicating the type of the data item. Organizing software 130 then generates a matrix which connects the accessing data to the descriptive data, thereby creating indexes into the descriptive data. The matrix, its generation and functions will be described in greater detail below.

Subsequently, when a user requests a particular piece of audiovisual content 110 by providing one or more features pertaining to this piece, a search module 140 is used to retrieve the requested piece of audiovisual content 110. Specifically, search module 140 first locates accessing data pertaining to the piece of audiovisual data and then uses the index created via the matrix to find descriptive data pertaining to this piece. Based on the located descriptive data, search module 140 retrieves the piece of audiovisual content 110 requested by the user.

Figure 2:
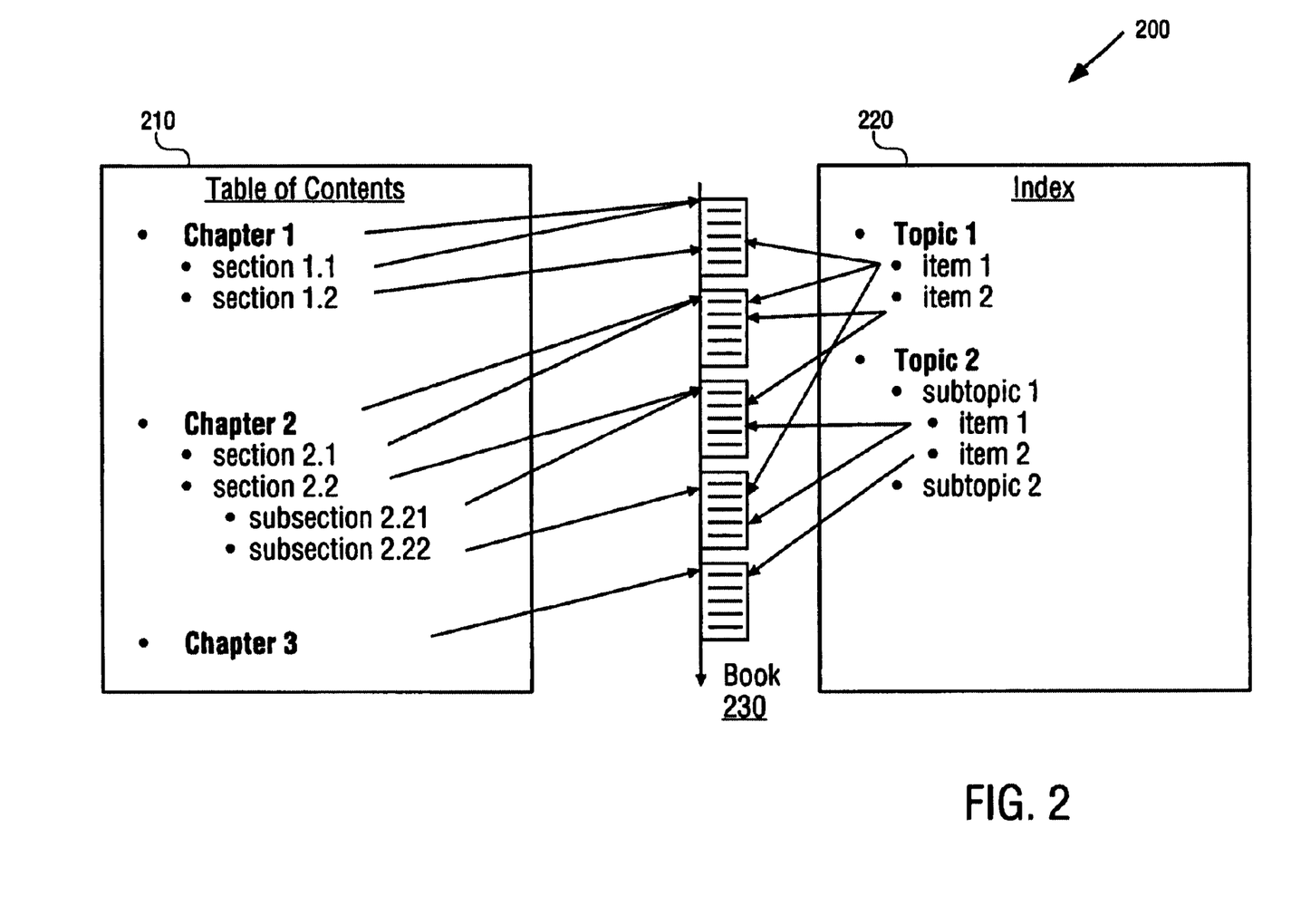
FIG. 2 illustrates a book organization model used in organizing data pertaining to audiovisual content.

FIG. 2 illustrates a book organization model used in organizing data pertaining to audiovisual content. Typically, a book includes a table of contents (TOC) and an index. The TOC describes individual collections of data (pages), and the index includes multiple features which point to certain collections of data in the TOC.

Referring to FIG. 2, a book 230 includes a TOC 210 and an index 220. In TOC 210, pages of book 230 are examined sequentially, and TOC entries are created. The TOC entries correspond to a particular part of the content of book 230. Each TOC entry represents a self-contained description of data such as a page, a chapter, a section, a subsection, etc. The entries have local features and are similar to items in a database. Index 220 includes a set of distinguished features (e.g., key words) which are tabulated in an ordered fashion. Each index entry lists all occurrences of a distinguished feature within the content of book 230. That is, an index entry is a set of pages (i.e., TOC entries) on which that index entry occurs.

Formally, there is no difference between TOC 210 and index 220. The purpose of having TOC 210 and index 220 is to provide the ability to access particular information in two distinct ways. In effect, TOC 210 can be characterized as a particular form of index 220, in which the distinguished features are beginnings of pages of a certain kind. While index 220 provides random and referenced access to the data, TOC 210 provides sequential and self-contained access to the same data.

As described above, the structure of the GAVDS divides descriptions of audiovisual content into semantic and syntactic. This classification was created to enable access to a required description entry by building indexes from semantic data items that point into syntactic data items. However, the above division presents problems, e.g., a problem to maintain the classification because the two categories are not pure, a problem to access semantic data because the semantic data is linked to the syntactic data with relational links which may be cumbersome to use, or a problem to navigate audiovisual content because the links between the semantic and syntactic data are one-directional (i.e., the navigation must start with finding semantic data which then points to corresponding syntactic data). In addition, semantic data and syntactic data are stored separately, thereby adding unnecessary overhead, especially for short descriptions.

When analyzing the book organization model, it becomes apparent that classifying descriptive information as either syntactic or semantic has no positive effect on the ability to build indexes to provide fast access to the descriptive information. Instead, efficient creation of indexes can be accomplished by a structure which divides the data into a descriptive portion (e.g., TOC entries) and an accessing portion (e.g., index entries). The descriptive data includes features pertaining to each piece of content, and the accessing data specifies which piece of content contains a particular feature. Referring to audiovisual content, the descriptive data may consist of audiovisual objects (i.e., pages in the TOC), with various features describing each audiovisual object (i.e., TOC entries). Each accessing entry may, in turn, include a list of occurrences of a particular feature. Further, if descriptive entries are described as points, then accessing entries may be described as sets of points, and consequently the relationship between the descriptive entries and the accessing entries can be geometrically characterized as an incidence structure, which may be represented by an incidence matrix. As will be described in more detail below, the incidence matrix provides an efficient mechanism for building indexes in one pass. In addition, by removing the syntactic/semantic classification, a general meaning-free structure is created which may be used for any description scheme.

Figure 3:
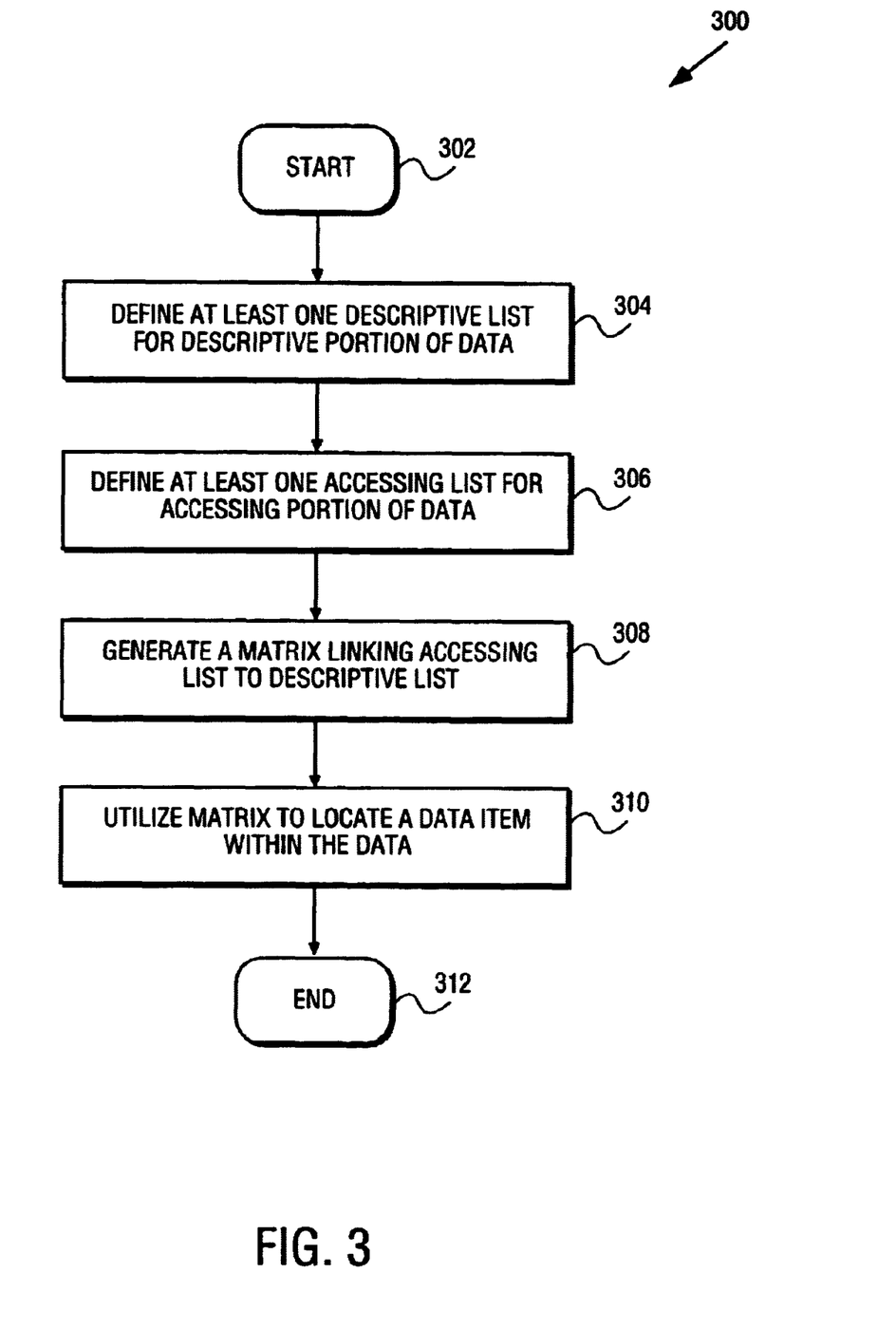
FIG. 3 is a flow diagram of one embodiment of a method for organizing data pertaining to audiovisual content.

FIG. 3 is a flow diagram of one embodiment of a method 300 for organizing data pertaining to audiovisual content. Initially, at processing block 304, one or more descriptive lists are defined for a descriptive portion of data pertaining to audiovisual content. At processing block 306, one or more accessing lists are defined for an accessing portion of the data pertaining to audiovisual content. As described above, descriptive entries describe audiovisual objects and accessing entries refer to every occurrence of these descriptions. In one embodiment, each data item within the data pertaining to audiovisual content includes a usage bit indicating whether the data item belongs to the descriptive or accessing portion of the data. For example, the usage bit may be set to one (1) if a data item is an accessing data item and to zero (0) if the data item is a descriptive data item.

In the preferred embodiment, both the descriptive list and accessing list must be complete. That is, when the descriptive data describes an audiovisual object using multiple descriptions, the descriptions must be self-contained and local to this audiovisual object. For example, if the description of a "shot" includes information about the syntax of the shot, the meaning of the shot and the models used for the shot, all this information should be packaged inside the descriptive data describing the shot. Similarly, the accessing data must contain complete lists of links into audiovisual content containing the corresponding features.

In one embodiment, each entry in the descriptive list is unique. That is, each object is described only once, and each feature included in the description is unique. Likewise, each entry in the accessing list may be unique. In one embodiment, the descriptive list and the accessing list may be ordered according to a particular sequence. The sequence may be, for example, chronological, by level of importance, by hues of color, etc.

At processing block 308, a matrix is generated to connect the accessing list to the descriptive list. In one embodiment, the matrix contains a plurality of rows corresponding to entries in the descriptive list, and a plurality of columns corresponding to entries in the accessing list. The matrix can be built in one pass by either describing its rows or its columns. Accordingly, the matrix enables a one-pass (i.e., O(n)) creation of indexes into the descriptive data.

Figure 4:
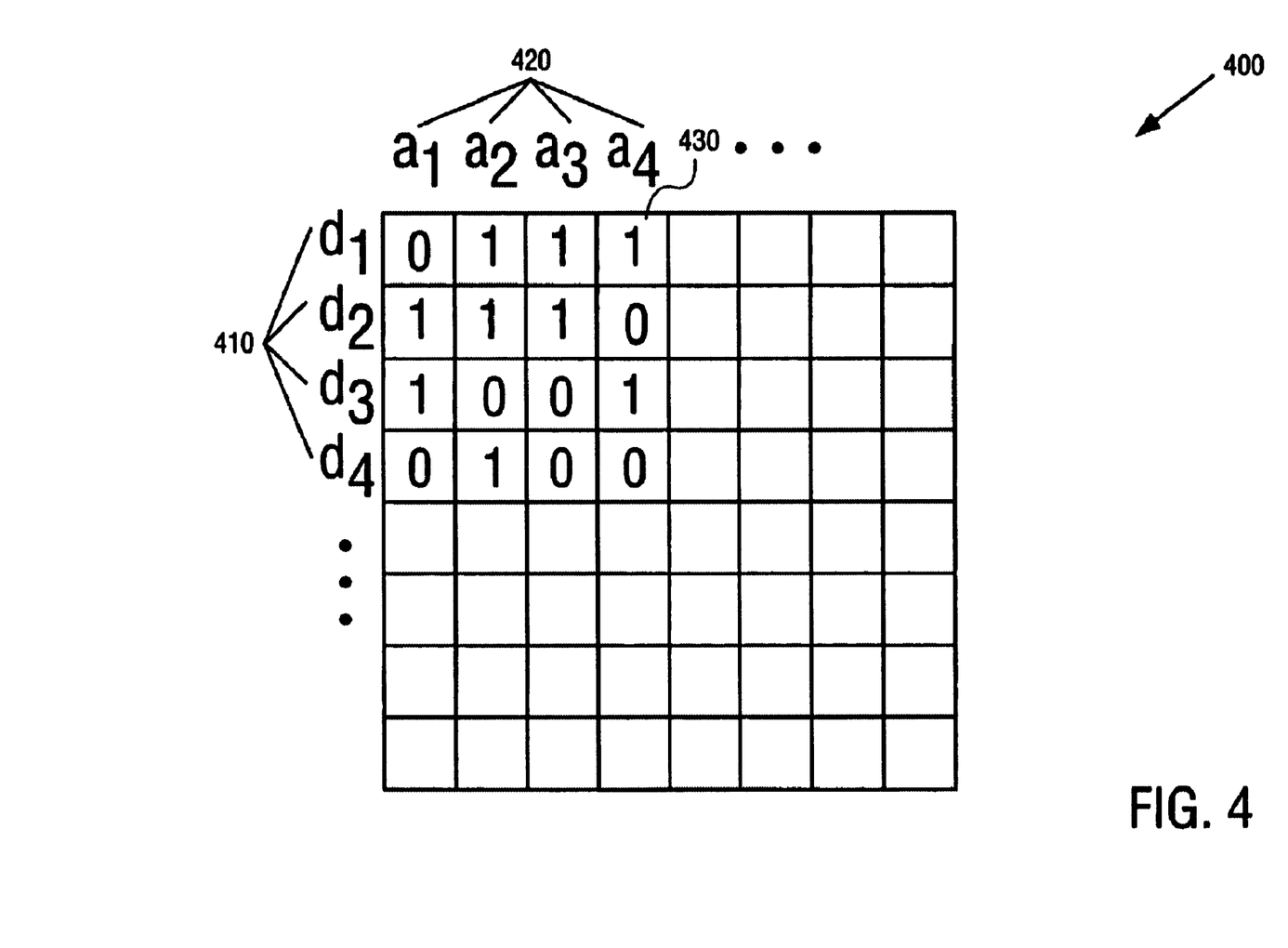
FIG. 4 is an exemplary matrix used to build indexes for data pertaining to audiovisual content, according to one embodiment of the present invention.

FIG. 4 illustrates an exemplary matrix 400 used to build indexes for data pertaining to audiovisual content, according to one embodiment of the present invention. Matrix 400 includes multiple columns corresponding to accessing entries 420 and multiple rows corresponding to descriptive entries 410. Matrix 400 may be generated in one pass through the row or column descriptions. That is, when building a row for a descriptive entry such as, for example, entry d1, every column intersecting with d1 is marked with one (1) or zero (0) depending on whether an accessing entry forming this column points to d1 or not. For example, intersection 430 of descriptive entry d1 and accessing entry a4 is marked with one (1) to indicate that accessing entry a4 points to d1. Likewise, when building a column for an accessing entry such as, for example, entry a1, every row intersecting with a1 is marked with one (1) or zero (0) depending on whether a1 points to a corresponding descriptive entry or not. When matrix 400 is generated, the index is also created as a set of columns 420 of matrix 400.

In one embodiment, in which each descriptive entry 410 is unique and each accessing entry 420 is unique, matrix 400 may be used to determine the importance of a particular item by counting a number of accesses for this item. For instance, if the object of descriptive entry d1 is a professor, and accessing list 420 is the Science Citation Index, the number of ones (1s) in row d1 may indicate how influential this professor is in the scientific community.

Returning to FIG. 3, the generated matrix is subsequently utilized to locate a data item within the data pertaining to audiovisual content (processing block 310). In one embodiment, when a user issues a request for audiovisual content by specifying a certain feature (i.e., an accessing data item) that the user is interested in, the index formed by the matrix is used to locate a corresponding descriptive data item. This descriptive data item is then used to find a desired piece of audiovisual content.

In one embodiment, a complete annotation of a piece of audiovisual content may require multiple descriptive lists, as well as multiple accessing lists. In this embodiment, either a single matrix or a set of matrixes can be used to link the accessing data to the descriptive data.

When a single matrix is used, multiple descriptive lists and accessing lists are amalgamated into a collection. In the collection, the matrix is still generated in one pass. The index may also be read in one pass as long as it is known which list is being read at a given point of time.

Alternatively, a set of matrixes may be used for connecting multiple accessing and descriptive lists. In this embodiment, entries in the accessing list may include accessing lists of lower rank, i.e., in this accessing list, the items accessed will be other accessing lists. Likewise, entries in the descriptive list may include descriptive lists of lower rank. As a result, the matrix will represent accesses to other descriptive lists, not to the individual descriptive data items. In this embodiment, a set of matrixes may be created to link accessing data to descriptive data of corresponding ranks. Specifically, a descriptive hierarchical structure may be created for the descriptive lists and an accessing hierarchical structure may be created for the accessing lists. Then, the set of matrixes is generated using these hierarchical structures. In one embodiment, each data item within the accessing and descriptive data contains a field for storing a rank identifier. The rank identifier is examined when each matrix is built, and only data items of the same rank are used to generate the matrix corresponding to this rank.

Figure 5:
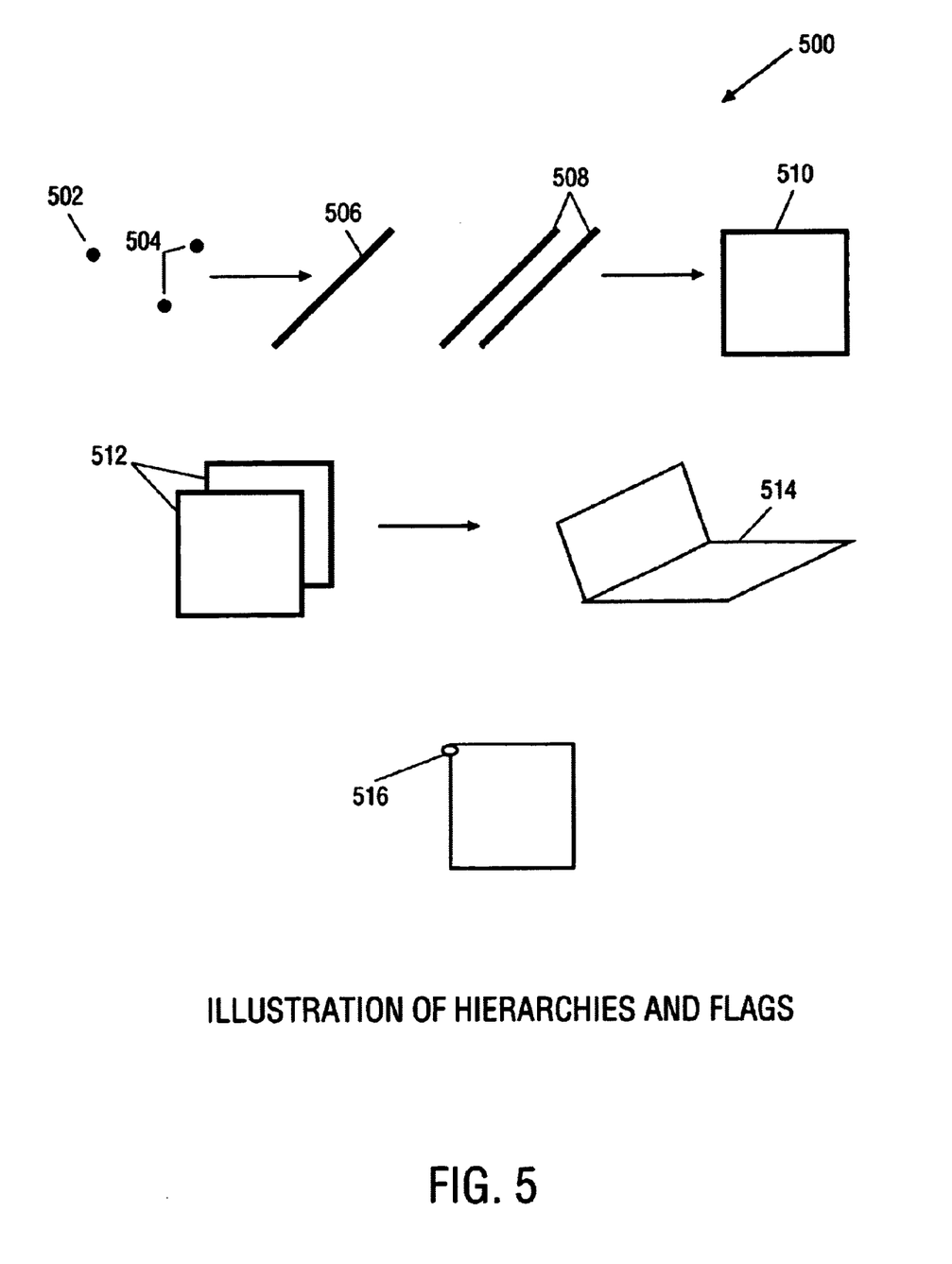
FIG. 5 illustrates a geometrical representation of hierarchies.

FIG. 5 illustrates a geometrical representation of hierarchies. As described above, each descriptive entry can be geometrically represented by a point, e.g., point 502. Each accessing entry may be represented by a set of points 504. Geometrically, each set of points 504 is a line 506, each set of lines 508 is a plane 510, each set of planes 512 is a volume 514, etc. A flag manifold, which includes one or more points (e.g., point 516) identifying a location at which a point, a line, a plane, etc. coexist, may be used to describe the entire geometry. Accordingly, a hierarchy can be built in which all the points belong to corresponding lines, all the lines belong to corresponding planes, all the planes belong to corresponding volumes, etc. As a result, a hierarchical tree structure is created to enable the efficient searching of multi-dimensional data.

Figure 6:
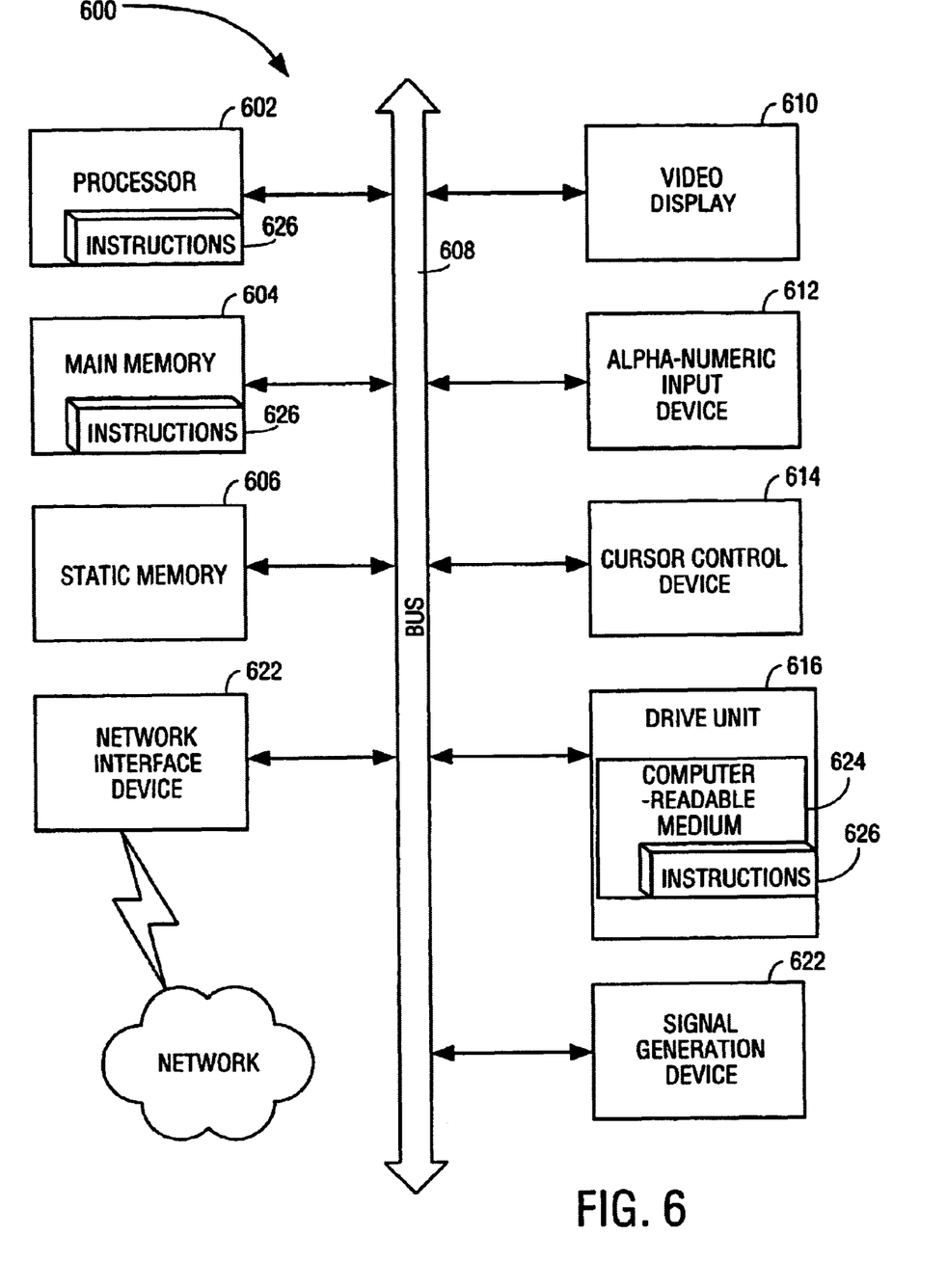
FIG. 6 is a block diagram of one embodiment of a computer system.

FIG. 6 shows a diagrammatic representation of machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 304 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 620 (e.g., a speaker) and a network interface device 622.

The disk drive unit 616 includes a computer-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 622. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for organizing data pertaining to audiovisual content have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for organizing data pertaining to audiovisual content, the method comprising:
   defining at least one descriptive list for a descriptive portion of the data pertaining to audiovisual content, the descriptive portion describing a plurality of features of the audiovisual content;
   defining at least one accessing list for an accessing portion of the data pertaining to audiovisual content, the accessing portion identifying occurrences of the plurality of features within the audiovisual content; and
   generating a matrix that connects the at least one accessing list corresponding to a first dimension of the matrix to the at least one descriptive list corresponding to a second dimension of the matrix.

2. The method of claim 1 wherein the data pertaining to audiovisual content includes a plurality of descriptions of the audiovisual content.

3. The method of claim 1 further comprising utilizing the matrix to locate a data item within the data pertaining to audiovisual content.

4. The method of claim 1 wherein each entry in the at least one descriptive list is unique.

5. The method of claim 1 wherein each entry in the at least one accessing list is unique.

6. The method of claim 1 further comprising ordering the at least one descriptive list according to a particular sequence.

7. The method of claim 1 further comprising utilizing a usage bit for each data item within the data pertaining to audiovisual content to indicate whether the data item belongs to the descriptive portion or to the accessing portion.

8. The method of claim 1 wherein generating the matrix further comprises:
   creating a plurality of rows in the matrix, the plurality of rows corresponding to entries in the at least one descriptive list;
   creating a plurality of columns in the matrix, the plurality of columns corresponding to entries in the at least one accessing list; and
   building the matrix in one pass.

9. The method of claim 8 wherein building the matrix in one pass includes building each of the plurality of columns by indicating, for every entry in the at least one descriptive list, whether said entry is referred to in a corresponding accessing entry.

10. The method of claim 8 wherein building the matrix in one pass includes building each of the plurality of rows by indicating, for every entry in the at least one accessing list, whether said entry points a corresponding descriptive entry.

11. The method of claim 1 wherein the at least one descriptive list contains a plurality of descriptive lists and the at least one accessing list contains a plurality of accessing lists.

12. The method of claim 11 further comprising:
   amalgamating the plurality of description lists and the plurality of accessing lists into a collection; and
   building the matrix for the collection in one pass.

13. The method of claim 11 further comprising:
   defining a descriptive hierarchical structure for the plurality of descriptive lists;
   defining an accessing hierarchical structure for the plurality of accessing lists; and
   generating a set of matrixes to connect the plurality of accessing lists to the plurality of descriptive lists based upon the descriptive hierarchical structure and the accessing hierarchical structure.

14. The method of claim 13 further comprising:
   storing a rank identifier for each data item within the data pertaining to audiovisual content; and
   utilizing the rank identifier when generating the set of matrixes.

15. A system for organizing data pertaining to audiovisual content, the system comprising:
   means for defining at least one descriptive list for a descriptive portion of the data pertaining to audiovisual content, the descriptive portion describing a plurality of features of the audiovisual content;
   means for defining at least one accessing list for an accessing portion of the data pertaining to audiovisual content, the accessing portion identifying occurrences of the plurality of features within the audiovisual content; and
   means for generating a matrix that connects the at least one accessing list corresponding to a first dimension of the matrix to the at least one descriptive list corresponding to a second dimension of the matrix.

16. A computer readable medium comprising instructions, which when executed on a processor, perform a method for organizing data pertaining to audiovisual content, the method comprising:

defining at least one descriptive list for a descriptive portion of the data pertaining to audiovisual content, the descriptive portion describing a plurality of features of the audiovisual content;

defining at least one accessing list for an accessing portion of the data pertaining to audiovisual content, the accessing portion identifying occurrences of the plurality of features within the audiovisual content; and generating a matrix that connects the at least one accessing list corresponding to a first dimension of the matrix to the at least one descriptive list corresponding to a second dimension of the matrix.

17. An apparatus for organizing data pertaining to audiovisual content, the apparatus comprising:

a data repository to store the data pertaining to audiovisual content, the data pertaining to audiovisual content including a descriptive portion describing a plurality of features of the audiovisual content and an accessing portion identifying occurrences of the plurality of features within the audiovisual content; and an organizing module to generate a matrix that connects the accessing portion corresponding to a first dimension of the matrix to the descriptive portion corresponding to a second dimension of the matrix.

18. The apparatus of claim 17 wherein the data pertaining to audiovisual content includes a plurality of descriptions of the audiovisual content.

19. The apparatus of claim 17 further comprising a search module to utilize the matrix to locate a data item within the data pertaining to audiovisual content.

20. The apparatus of claim 17 wherein each entry in the at least one descriptive list is unique.

21. The apparatus of claim 17 wherein each entry in the at least one accessing list is unique.

22. The apparatus of claim 17 wherein the organizing module is capable of ordering the at least one descriptive list according to a particular sequence.

23. The apparatus of claim 17 wherein the organizing module is capable of utilizing a usage bit for each data item within the data pertaining to audiovisual content to indicate whether the data item belongs to the descriptive portion or to the accessing portion.

24. The apparatus of claim 17 wherein the organizing module is capable of generating the matrix by creating a plurality of rows in the matrix, the plurality of rows corresponding to entries in the at least one descriptive list, creating a plurality of columns in the matrix, the plurality of columns corresponding to entries in the at least one accessing list, and building the matrix in one pass.

25. The apparatus of claim 24 wherein the organizing module is capable of building the matrix in one pass by indicating, for every entry in the at least one descriptive list, whether said entry is referred to in a corresponding accessing entry.

26. The apparatus of claim 24 wherein the organizing module is capable of building the matrix in one pass by indicating, for every entry in the at least one accessing list, whether said entry points a corresponding descriptive entry.

27. The apparatus of claim 24 wherein the organizing module is capable of amalgamating the plurality of description lists and the plurality of accessing lists into a collection, and building the matrix for the collection in one pass.

28. The apparatus of claim 17 wherein the at least one descriptive list contains a plurality of descriptive lists and the at least one accessing list contains a plurality of accessing lists.

29. The apparatus of claim 28 wherein the organizing module is capable of defining a descriptive hierarchical structure for the plurality of descriptive lists, defining an accessing hierarchical structure for the plurality of accessing lists, and generating a set of matrixes to connect the plurality of accessing lists to the plurality of descriptive lists based upon the descriptive hierarchical structure and the accessing hierarchical structure.

30. The apparatus of claim 29 wherein the organizing module is capable of storing a rank identifier for each data item within the data pertaining to audiovisual content, and utilizing the rank identifier when generating the set of matrixes.

* * * * *